W. L. CUSICK.
COMBINED LEVEL, PLUMB, AND GAGE.
APPLICATION FILED MAR. 22, 1918.
1,308,699.
Patented July 1, 1919.
2 SHEETS—SHEET 1.
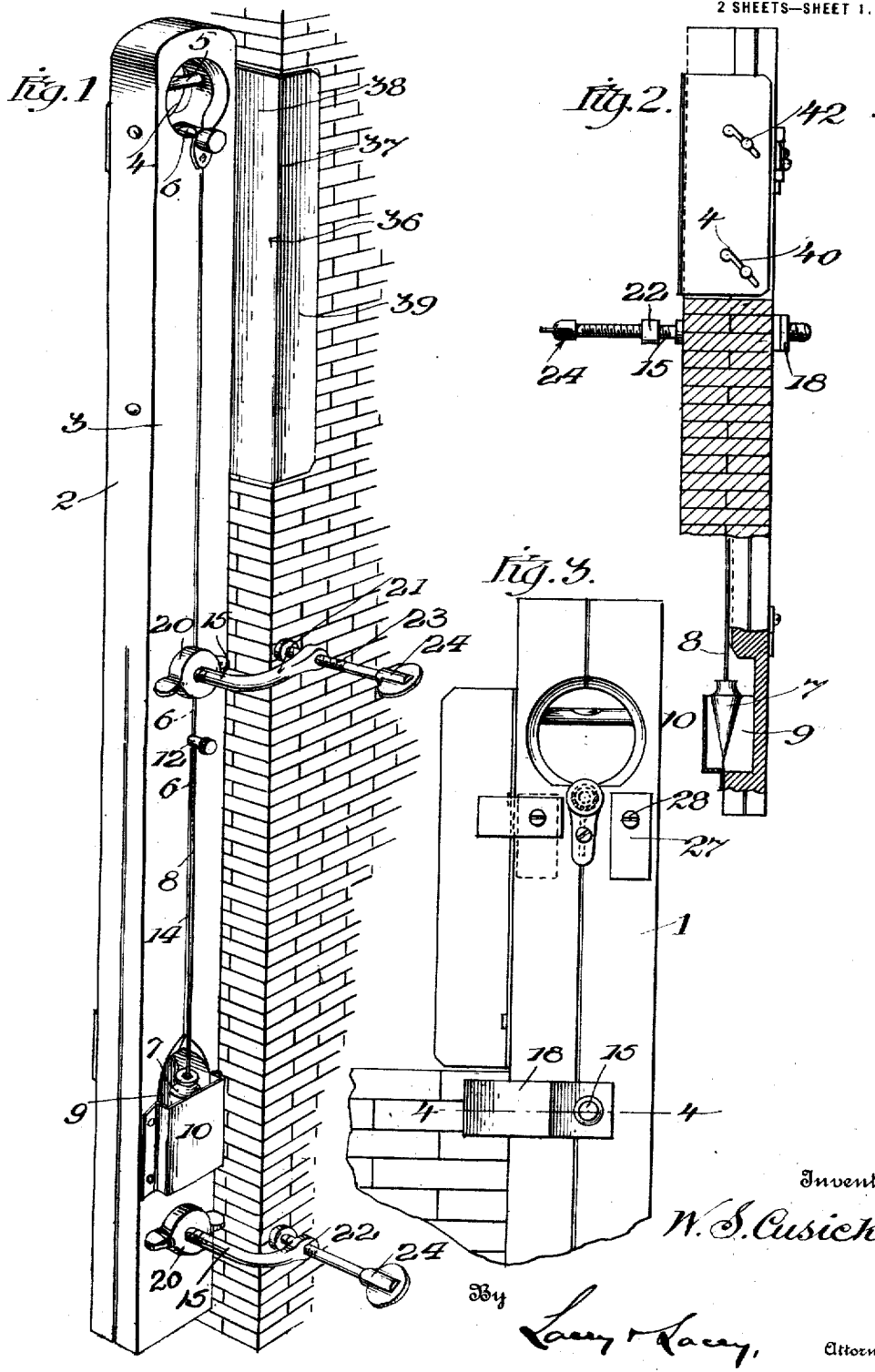
Inventor
W. S. Cusick.
By Lacey & Lacey,
Attorneys W. L. CUSICK.
COMBINED LEVEL, PLUMB, AND GAGE.
APPLICATION FILED MAR. 22, 1918.
1,308,699.
Patented July 1, 1919.
2 SHEETS—SHEET 2.
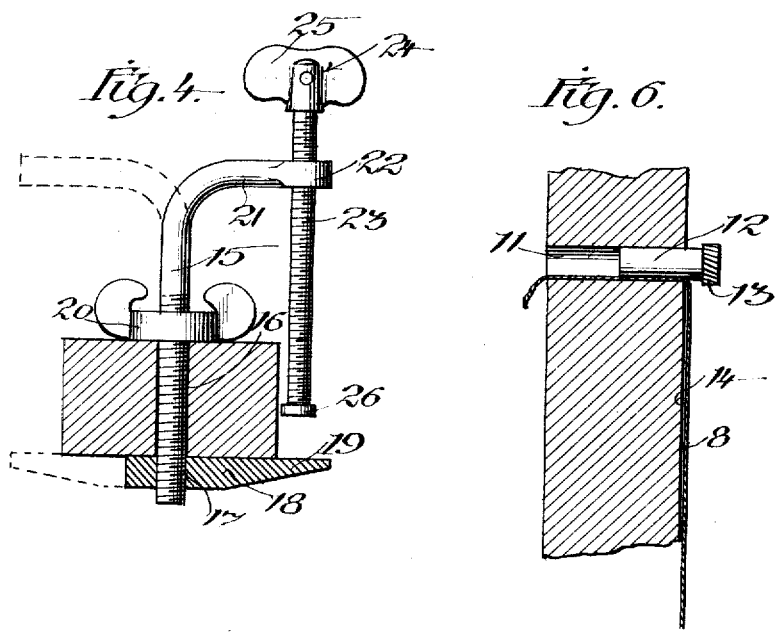
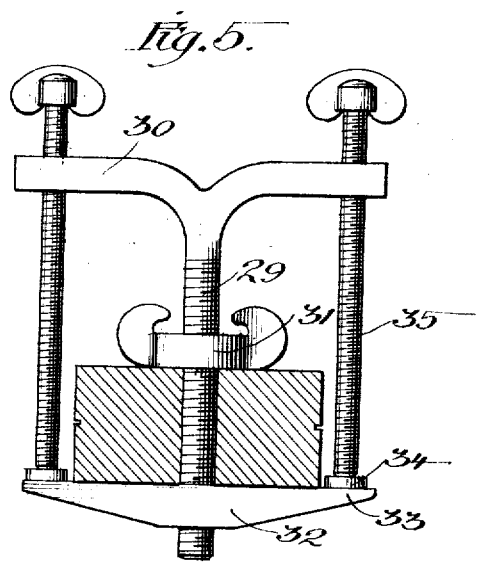
Inventor
W. S. Cusick.
By
Lacey & Lacey,
Attorneys

UNITED STATES PATENT OFFICE.

WILFRED L. CUSICK, OF FOLLANSBEE, WEST VIRGINIA.

COMBINED LEVEL, PLUMB, AND GAGE.

1,308,699. Specification of Letters Patent. Patented July 1, 1919.

Application filed March 22, 1918. Serial No. 224,008.

*To all whom it may concern:*

Be it known that I, WILFRED L. CUSICK, a citizen of the United States, residing at Follansbee, in the county of Brooke and State of West Virginia, have invented certain new and useful Improvements in Combined Levels, Plumbs, and Gages, of which the following is a specification.

This invention has as its object to provide a combined level, plumb, and gage which will be particularly useful to carpenters, builders, and brick layers.

It is one object of the invention to provide an instrument of this class which will be adapted for application to a wall, door or window frame, or other piece of work to determine at a single trial whether the work is plumb or true in two directions. In the use of the ordinary level or plumb it is, of course, necessary that the same be applied first to one side of the work and then to the other side thereof in order to determine whether the work is plumb in both directions and, therefore, the device of the present invention presents a decided advantage over the ordinary plumb or level inasmuch as it is adapted as above stated to indicate both of these facts upon a single application to the work.

Another object of the invention is to provide an instrument of this class which will be particularly useful to brick layers inasmuch as it may be clamped to a portion of a wall being built and then employed as a gage in laying other bricks which are to extend the wall, the device being shifted at intervals vertically upon the wall as the bricks are laid, so that having built the lower portion of a wall plumb in both directions, the device may be brought into use by the brick layer to enable him to more rapidly and accurately lay succeeding tiers of bricks or stone.

A further object of the invention is to so construct the device that the same may be readily adapted for application against a piece of work in the most convenient position, that is to say against either the right hand or left hand side of the work.

The invention also embodies other features of construction which possess marked advantages and which will be more fully described hereinafter.

In the accompanying drawings:

Figure 1 is a perspective view of the device embodying the present invention, the view illustrating the manner in which the device is to be applied to a wall being built;

Fig. 2 is a side elevation of the device applied, the lower portion of the device being shown in vertical section;

Fig. 3 is a front elevation of the device applied to a wall;

Fig. 4 is a horizontal sectional view taken substantially on the line 4—4 of Fig. 3 and illustrating the clamping members of the device in full lines at one side of the stock and in dotted lines adjusted to position to extend at the other side of the stock;

Fig. 5 is a view similar to Fig. 4 illustrating a slightly modified form of the invention;

Fig. 6 is a vertical sectional view taken substanially on the line 6—6 of Fig. 1.

The device embodying the present invention includes a stock which is indicated by the numeral 1 and which may be of wood or any other suitable material and which has parallel side edges 2 and parallel faces 3. Near one end which may be considered as the upper end, the stock is formed with an opening 4 which opens through the faces 3 thereof and within which is arranged a spirit tube 5 which extends chordally of the said opening in a general direction at right angles between the engaging edges 2 of the stock. A similar spirit tube 6 is arranged within the lower side of the opening 4 and extends in a general direction at right angles to the planes of the faces 3 of the stock and, therefore, at right angles to the tube 5. The numeral 7 indicates a plumb bob which is suspended at the lower end of a cord 8 and which is preferably housed within a recess 9 formed in one face 3 of the stock 1, the recess being partly closed by a casing 10 secured to the said face of the stock and forming a pocket in conjunction with the recess 9. The cord 8 is led through an opening 11 which extends between the faces 3 of the stock and the depending length of the cord may, of course, be adjusted by pulling the cord in one direction or the other through the said opening 11. The cord is held at adjustment, however, by means of a friction plug or pin 12 having a finger knob 13 whereby it may be readily grasped and inserted into or removed from the opening 11, the said plug or pin being designed to bind the cord 8 against the lower side of the wall of the said opening in the manner clearly shown in Figs. 1 and 6 of the drawings. In order to indicate when the cord 8 is hanging vertically, the face 3 of the stock beside which the cord depends is preferably formed with a vertically extending groove or provided with a designating mark or line, as indicated by the numeral 14 with which the cord is designed to register when the stock is truly vertically held.

As before stated means is provided whereby the device may be clamped to a wall, window frame, door frame, or other piece of work and one form of this clamping means is clearly illustrated in Fig. 4 of the drawings and comprises a bracket member which has a finger 15 fitted through an opening 16 formed through the stock 1 and opening at its ends through the opposite faces 3 of the stock. The shank 15 is threaded as clearly shown in the said figure and at or adjacent its extremity fits within an opening 17 formed in a clamping head 18 which has a jaw portion 19 designed to extend beyond either edge 2 of the stock, it being evident from inspection of Fig. 4 that the clamping member may be caused to assume either the full or the dotted line position shown in said figure due to the fact that the shank 15 may be swiveled within the opening 16. In order, however, to secure the clamping head 18 in place after it has been adjusted so as to have its clamping jaw portion 19 extend beyond the desired edge of the stock, a thumb nut 20 is threaded on to the said shank and is adapted to be tightened to bear against one of the faces 3 of the stock and draw the clamping head 18 firmly against the opposite face of the stock. This thumb nut is, of course, to be loosened slightly when it is desired to swivel the shank 15 within the opening 16 to suitably position the clamping head 18. At its end opposite its threaded end, the shank is turned laterally at right angles to provide an arm 21 formed at its outer end with a head 22 through which is adjustably threaded the shank 23 of a clamping screw 24, the shank of the screw being provided at one end with the usual winged head 25 and at its other end with a swiveled bearing head 26. In adjusting the clamping device for use, the shank 15 is, of course, so swiveled in the opening 16 that the clamping screw 24 and the clamping jaw 19 of the head 18 will lie at the same edge of the stock as shown in full lines in Fig. 4 and, consequently, when the said edge of the stock is disposed against a piece of work with the jaw portion 19 also engaging against an adjacent face of the work, the clamping screw 24 may be tightened to cause its head 26 to bear against the opposite face of the work thereby clamping the stock securely in place. In order to provide for correct alinement of the stock with the work and a more secure bearing of the same against the work, abutment members are provided above and below the clamping device just described and preferably one pair of these members is located above and another pair below the said device. Each of the members comprises a plate 27 disposed against that face 3 of the stock against which the clamping head 18 is disposed, and swiveled at one end to the said face as indicated by the numeral 28. These abutment members 27 may be, of course, swung upon their swivels 28 so as to project beyond the adjacent edge of the stock and, of course, when the head 18 of the clamping device is in position projecting beyond one edge of the stock, the abutment members 27 adjacent said edge will be similarly adjusted, the engaging faces of the said members and the jaw portion 19 occupying a common plane at right angles to the plane of the said edge of the stock and all three elements being designed to engage against that face of the work which is next adjacent the face of the work against which the edge of the stock is disposed. When the abutment members 27 are not in use they may be swung down as illustrated at the right of Fig. 3 of the drawings, so as to lie within the bounds of the edges 2 of the stock.

Instead of employing the reversible clamping device shown in Fig. 4 of the drawings and above described, I may find it desirable to employ a clamping device of the form shown in Fig. 5. In this figure the numeral 29 indicates a shank corresponding to the shank 15 and provided at one end with oppositely extending arms 30 corresponding to the arm 21. The shank 29 has fitted thereon a thumb nut 31 corresponding to the thumb nut 20 and the end portion of the shank is threaded into an opening formed in a clamping head 32 corresponding to the head 18 except that it is provided with two clamping jaw portions indicated by the numeral 33 and corresponding to the jaw portion 19, the said jaw portions 33 extending beyond the opposite edge faces of the stock 1 in position for coaction with swiveled bearing heads 34 at the ends of clamping screws 35 which are adjustably threaded through the outer ends of the respective arms 30.

The gage member heretofore referred to is indicated in general by the numeral 36 and is preferably formed from an integral sheet metal plate which is bent parallel to its longitudinal edges as at 37 to provide an attaching portion 38 and an abutment or gage flange 39 which extends at right angles to the plane of the attaching portion 38. The attaching portion 38 is formed with diagonal keyhole slots 40, the enlarged ends of which are indicated by the numeral 41, and driven into the opposite edges of the stock 1 in spaced relation with respect to each other are headed pins or studs 42 which work in the said slots 40, the heads of the studs being of a diameter to permit of their passage through the openings 41 so that the gage member may be disconnected from one straight edge of the stock and applied to the other straight edge thereof. Of course, by reason of the engagement of the studs 42 in the slots 40, the gage member 36 may be adjusted so as to cause its abutment or gage flange 39 to occupy a position more or less remote from that face of the stock at which the head 18 and members 27 are located. Thus for example when the lower portion of a wall has been laid or built, the device may be clamped to the said lower or completed portion of the wall in the manner clearly shown in Figs. 1, 2 and 3 of the drawings, and the gage member 36 then shifted upon the straight edge of the stock so that the inner face of the flange 39 at its lower end will abut against that face of the wall opposite the face which is engaged by the members 18 and 27. With the device clamped in this position and thus adjusted, a number of other tiers or bricks or stone may be laid upon the completed tiers, the bricks as laid being brought to position against the inner face of the abutment or gage flange 39. Thus not only may the wall be plumbed in so far as concerns its edge but also as concerns its opposite faces and with a single application of the device thereto.

Where the instrument embodying the present invention is to be employed by application to a brick wall in the course of construction of the said wall, it will be desirable to provide the stock of the instrument with two of the clamping devices heretofore described, and as clearly shown in Fig. 1 of the drawings, the second or supplemental clamping device being located below the plumb bob casing 10, or in other words, near the lower end of the stock.

Having thus described the invention, what is claimed as new is:

1. The combination with a level, plumb, or similar instrument, including a stock, of means for clamping the stock to work including a member having a shank swiveled in the stock, a clamping head fitted to the said shank at one face of the stock and having a jaw portion designed to project beyond either edge of the stock, means for securing the said member against swiveling movement, and a clamping screw carried by the member for coaction with the said jaw portion.

2. The combination with a level, plumb, or similar instrument including a stock having parallel straight edges, of means for clamping the stock to work with either straight edge presented to the work including a member swiveled upon the stock, a clamping head carried by the member at one face of the stock, and a clamping screw carried by the member at the other face of the stock, and means for securing the member against movement with relation to the stock.

3. The combination with a level, plumb, or similar instrument, including a stock having parallel straight edges, of means for clamping the stock to work with either straight edge presented to the work including a member swiveled upon the stock, a clamping head carried by the member at one face of the stock, a clamping screw carried by the member at the other face of the stock, and abutment members swiveled upon that face of the stock at which the clamping head is located and located one adjacent one straight edge of the stock and the other adjacent the other straight edge thereof and adapted to be independently swung outwardly to provide work engaging elements supplemental to the said clamping head.

4. The combination with a level, plumb, or similar instrument including a stock having a straight edge, of a plate disposed against the said edge and provided at one margin parallel to the edge with a flange occupying a plane at right angles to its outwardly presented face, and means supporting the plate upon the said edge of the stock for adjustment across the said edge of the stock.

In testimony whereof I affix my signature.

WILFRED L. CUSICK. [L. S.]

Copies of this patent may be obtained for five cents each, by addressing the "Commissioner of Patents, Washington, D. C."